United States Patent Office 3,296,169
Patented Jan. 3, 1967

3,296,169
VINYL ACETATE-METHYL METHACRYLATE-ACRYLIC ACID COPOLYMER LATICES
Albert E. Corey, East Longmeadow, Mass., assignor, by mesne assignments, to Monsanto Company, a corporation of Delaware
No Drawing. Filed Jan. 31, 1963, Ser. No. 255,163
5 Claims. (Cl. 260—29.6)

This invention relates to new vinyl acetate copolymer latices. More particularly, it relates to aqueous emulsions of copolymers of vinyl acetate with methyl methacrylate, acrylic acid and, if desired, ethyl acrylate or other similar compounds.

Polyvinyl acetate is a well known and widely used synthetic resin. Methods for its preparation and suggestions for its employment abound in the literature. The monomer, vinyl acetate, has been polymerized alone or with a great variety of comonomers in many different ways. Yet, remarkably, almost all the emulsions of vinyl acetate polymer available heretofore possess the property of filming at room temperature, i.e. of leaving a continuous film on a substrate when applied and dried at room temperature. While this property is a rather advantageous one in many applications of these useful emulsions, there exist occasions when it would be preferable that a vinyl acetate polymer emulsion be non-filming at room temperature so that materials coated or impregnated therewith could remain flexible until final shaping. Absence of filming at room temperature would be especially valuable in cases where the particular polymer to be used must impart great hardness and stiffness to the material coated or impregnated.

There are of course certain vinyl acetate vinyl chloride copolymer emulsions available which lay non-continuous films requiring heat in order to coalesce. But, as far as we know, no vinyl acetate:acrylic copolymer emulsion possesses the required non-filming ability. Neither do the strictly "acrylic" polymers, for that matter, the term "acrylic" being used herein to denote all the polymerizable compounds encompassed by the acrylic acids, their alkyl substituted products and their derivatives.

It is accordingly an object of this invention to provide aqueous latices of vinyl acetate copolymers which do not form continuous films when dried at room temperature. Such copolymers must be subjected to moderate heat treatment in order to coalesce into continuous films. Another object is to provide multipolymer latices which can impart to materials treated therewith a high degree of stiffness and rigidity. It is a further object to provide latices of vinyl acetate polymers which, after application and fusing at moderate temperatures, will leave continuous films having superior scrub resistance, excellent water spotting resistance, excellent adherence to a variety of surfaces and retain good wet strength after prolonged immersion in water. Still another object is to produce emulsions compatible with a wide range of modifying ingredients such as, for instance, softer polyvinyl acetate emulsions in order to produce films of reduced hardness.

These and other objects which will become apparent in the course of the following description of the invention have been accomplished by the preparation of fine particle size aqueous emulsions of interpolymers if vinyl acetate with methyl methacrylate stabilized with small amounts of copolymerized acrylic acid. The interpolymers may also contain substantial amounts of copolymerized ethyl acrylate or other "softening" comonomer.

The technique and the products of this invention will now be described in more detail in the following examples. It is understood that these examples are to be regarded as illustrative only and not in any way as limiting the scope of the invention which is defined by the appended claims. All parts and percentages given in the examples are by weight.

Example 1

| | | |
|---|---:|---:|
| Water | 52.42 | |
| Aerosol OT (75%) | 0.60 | |
| Aerosol MA (80%) | 0.56 | |
| Sodium bicarbonate | 0.17 | |
| Potassium persulfate | 0.30 | |
| Ethyl acrylate | 2.30 | 5% |
| Methyl methacrylate | 18.40 | 40% |
| Vinyl acetate | 24.84 | 54% |
| Acrylic acid | 0.46 | 1% |
| | 100% | |

The "Aerosols" are heat stable wetting agents that are soluble in practically all nonaqueous media as well as in water; they are esters of sulfonated dicarboxylic acids, "OT" being a 75% by weight solution of sodium dioctyl sulfosuccinate and "MA," an 80% solution of its dihexyl homolog.

The above ingredients, except for the monomers, were charged into the reaction vessel and dissolved. The monomers were mixed together and 5% of the mixture was added to the reaction vessel. The batch was stirred continually and its temperature was raised to 72° C. The rest of the monomer mixture was then fed in gradually at a rather slow rate, the temperature being maintained within the range of 75–80° C. as the polymerization proceeded. The rate of addition for the 95% portion of the monomer mixture not originally charged into the vessel was such that about 30% of that portion had been added after two hours of reaction time, the rest being fed in at an accelerated rate which rose ultimately to twice the original addition rate. After completing the addition of the monomers, the temperature of the batch was raised to 90° C. and the agitation was maintained for another 15 minutes to complete the polymerization.

The product was a stable latex containing approximately 47% solids and having a Brookfield viscosity (No. 1 spindle, 30 r.p.m.) of 37 centipoises at 25° C., a pH of 4.6 and a number average particle size of 0.14 micron. The coalescing temperature of the dry polymer was found to be 74–75° C.

The "coalescing temperature" was determined by applying the latex to a surface, e.g. a glass plate, air drying the liquid film at room temperature for 12 hours, scraping up a small amount of the powdery residue, heating it on a Fischer-Johns melting point block and noting the temperature at which the white, opaque dry polymer becomes soft and transparent. This temperature is an indication of the glass point of the polymer and, in addition to being a reproducible identifying characteristic of the polymer tested, it holds further significance in that at that point and beyond the dry, powdery polymer can be made into a hard, continuous film, if it has previously been uniformly distributed upon a given surface.

Example 2

This preparation was essentially similar to that of Example 1, except that only 0.45 part of Aerosol MA was used and that Aerosol OT was replaced by 1.43 parts of a nonionic alkyl aryl polyether which is the reaction product of one mol t-octylphenol with 30 mols ethylene oxide. This new surfactant was added as a 70% solution.

The resulting latex had the following properties: total solids, 46–47%; Brookfield viscosity at 25° C. (No. 1 spindle, 30 r.p.m.), 17 centipoises; pH, 4.6; coalescing point, 63–65° C.; and number average particle size, 0.12 micron.

In Examples 3 to 6, the composition of the monomer charge was varied in order to study its effect on the properties of the latex, especially on the coalescing temperature of the dry polymer. The other ingredients of the preparation and the method employed were those of Example 1. The variations in composition are given in Table 1 in terms of percent by weight of each monomer present in the composition, and the resulting coalescing temperature is reported. Comparable values obtained for the latex of Example 1 are included in the table for added interest.

TABLE 1

| Example | Monomer composition, percent | | | | Coalescing Temperature, ° C. |
|---|---|---|---|---|---|
| | EA | MMA | VAc | AA | |
| 1 | 5 | 40 | 54 | 1 | 74-75 |
| 3 | 5 | 45 | 49 | 1 | 73-74 |
| 4 | 10 | 45 | 44 | 1 | 69-71 |
| 5 | 0 | 75 | 24 | 1 | 100-102 |
| 6 | 0 | 45 | 54 | 1 | 76 |

It becomes evident upon examination of the above results that all the latices there described are not film formers at room temperature in that a coating deposited by said latices must be heated before a hard continuous film of the polymer can be formed on a given surface.

In general, the latices of this invention are aqueous emulsions of copolymers of vinyl acetate with methyl methacrylate stabilized with a small amount of an acrylic acid. They may contain from about 30 to about 55% solids by weight, the preferred and most economical solids concentration being, for most applications between 40 and 50%. The copolymer is dispersed in the form of very fine particles having a number average diameter ranging from 0.10 to 0.20 micron. The latices are mildly acidic. Their viscosity at room temperature may vary a great deal depending on actual particle size, solids concentration, surfactant composition and so on. They are stable on storage.

On application and air drying, the latices leave a discontinuous film which upon heating for a short time at an appropriate temperature will "fuse" into a hard, continuous, water resistant film capable of imparting remarkable stiffness to any soft material that it impregnates or to which it adheres.

The essential component of the latices is a copolymer of vinyl acetate with methyl methacrylate stabilized with a small amount of an acrylic acid. The monomer composition of this polymer may vary as follows, depending on the particular properties desired for the copolymer, namely coalescing temperature, hardness and flexibility: the methyl methacrylate monomer component may be present to the extent of 33% to 85% by weight of the total monomer mixture; 0.5% to 2% of an acrylic acid is used as stabilizer; and vinyl acetate is added to complete the mixture. An alkyl ester of acrylic acid may also be added in amounts of up to 25% by weight of the total monomer composition if it be desirable that the polymer be more flexible. In any event, the final monomer composition should consist of not less than about 10% by weight of vinyl acetate units, with the result that when high proportions of the methyl methacrylate are used, the acrylic ester component selected should be one of the "softer" ones of the usable compounds in that class.

The preferred acrylic ester monomer is ethyl acrylate. Usable ones however include other acrylates with alkyl groups containing from 1 to 10 carbon atoms, e.g. methyl, butyl, ethylhexyl, decyl and so on. As to the acrylic acids usable for stabilizing the latex, they include acrylic acid, methacrylic acid, crotonic acid and so on, although the preferred one, for economy and efficiency, is acrylic acid itself. Certain other copolymerizable acids such as itaconic acid may also be used.

The most useful latices of the invention will be made with polymers having the following composition: 40% to 50% methyl methacrylate, about 1% acrylic acid, 5% to 10% ethyl acrylate, and vinyl acetate to 100%.

The surfactants which may be employed in the formulations may be anionic, nonionic or cationic. Mixtures may also be employed. The anionic types are preferred. Variations in the nature and the amount of such agents will influence the stability of the emulsions as well as the progress of the polymerization in easily determined manner but the effects of such variations are not contemplated as part of the present invention. In any case, the surfactants selected should contain at least twelve carbon atoms and their total weight should not exceed 5% of the latex weight. Examples of anionic emulsifying agents that may be used include the higher fatty alcohol sulfates such as sodium lauryl sulfate, the alkyl aryl sulfonates such as sodium t-octylphenyl sulfonate, the sodium dioctyl sulfosuccinates, the sodium dihexyl sulfosuccinates, and so on. Among the usable nonionic dispersants are the alkylphenoxypolyethoxy ethanols having alkyl groups of about 7 to 18 carbon atoms and 6 to 60 or more oxyethylene units, such as the octylphenoxy polyethoxyethanols; the polyethoxyethanol derivatives of methylene linked alkyl phenols; the ethylene oxide derivatives of long chain carboxylic acids such as lauric, myristic, oleic, or mixtures of such acids as found in tall oil, containing 6 to 60 oxyethylene units per molecule; block copolymers of ethylene oxide and propylene oxide comprising a hydrophobic propylene oxide segment combined with one or more hydrophilic ethylene oxide segments.

Any of the heat decomposable addition polymerization catalsyts can serve. These include the inorganic persulfates, hydrogen peroxide, hydrogen peroxide:ferric chloride, potassium persulfate: sodium metabisulfite, t-butyl hydroperoxide:sodium formaldehyde sulfoxylate, the perborates, and so on. The preferred catalysts are the water soluble ones.

Concerning the process, it has been pointed out in Example 1 that the rate of monomer mixture addition to the polymerization vessel is critical in order to keep the reaction under control. In general, it may be said that this rate should be slower than what is normal for similar operations. The selection of an actual rate to be used of course is fairly empirical since it must depend on the apparatus employed, its cooling provisions, the particular monomer mixture and the type of agitation selected. With respect to the latter variable, moderate speed low shear agitation is preferred, such as that provided for instance by a paddle agitator as opposed to a four-blade turbine.

The latices of this invention have been found exceptionally useful as stiffening agents in textile finishing of both woven and nonwoven fabrics. The nature of the polymer also renders the latices particularly effective in imparting increased stiffness to cellulosic materials. As wet end additives, the latices significantly improve the sizing, the rigidity and the strength of paper products. The dried flaky colored polymer obtained from latices to which color pigments have been added may be used as the wear layer for floor tile, in decorative panels, in molding powders, as spray dried pigment for aqueous paint systems, as terrazzo floor chips, and so on. Many other uses will suggest themselves to the man skilled in the art, especially in applications where the obtention of a stiff, hard coating is better delayed until the soft material coated or impregnated is formed.

What is claimed is:

1. A stable, aqueous emulsion of a hard polymer which is non-filming at room temperature and which is made from a monomer mixture comprising 0.5 to 2% by weight of an acrylic acid, 33 to 85% of methyl methacrylate, and at least 10% of vinyl acetate.

2. The emulsion of claim 1 wherein the acrylic acid in the monomer mixture is acrylic acid.

3. The emulsion of claim 1 wherein the polymer is made from a monomer mixture comprising also up to 25% by weight of an alkyl acrylate containing from 1 to 10 carbon atoms in the alkyl group.

4. A stable, aqueous emulsion of a hard polymer which is non-filming at room temperature and which is made from a monomer mixture comprising 40 to 50% by weight of methyl methacrylate, about 1% of acrylic acid and at least 10% of vinyl acetate.

5. The emulsion of claim 4 wherein the polymer is made from a monomer mixture comprising also from 5 to 10% by weight of ethyl acrylate.

References Cited by the Examiner

UNITED STATES PATENTS

| 2,739,136 | 3/1956 | Kharasch et al. | 260—29.6 |
| 2,845,398 | 7/1958 | Brown et al. | 260—29.6 |

MURRAY TILLMAN, *Primary Examiner.*

J. ZIEGLER, *Assistant Examiner.*